April 5, 1966 G. D. BRUCE 3,245,058

SEMI-PERMANENT MEMORY

Filed Dec. 15, 1961 3 Sheets-Sheet 1

INVENTOR
GEORGE D. BRUCE

BY Roger S. Smith

ATTORNEY 3,245,058

SEMI-PERMANENT MEMORY

George D. Bruce, Poughkeepsie, N.Y., assignor to International Business Machines Corporation, New York, N.Y., a corporation of New York Filed Dec. 15, 1961, Ser. No. 159,589
4 Claims. (Cl. 340—174)

The present invention relates to improvements in magnetic storage and switching systems, and is directed in particular to systems of the "read-only" or "semi-permanent" type.

The terms "read-only memory" or "semi-permanent memory," as employed herein, refer to an information storage system of the type wherein information words or code groups are stored in such a way that they can be repeatedly read out in a rapid and simple manner without being removed or destroyed, but wherein a change of the stored information requires operation of some external agency. Such a memory is useful in any data handling system where it is desirable to have available a number of words or code groups which may be repeatedly employed by the system in various operations, but which do not require alteration except at infrequent intervals. Such a storage system might be employed, for example, to store program control words in a computer system, or as a library of reference data relating to certain computer operations.

It is the object of this invention to provide an improved memory of the read-only or semi-permanent type.

More specifically it is an object of the invention to provide a semi-permanent memory wherein alteration of stored information may be quickly and easily accomplished.

It is an object of this invention to provide a semi-permanent memory of the type wherein information is recorded by the presence or absence of coupling between input and output means and which includes a novel arrangement for controlling the presence or absence of the coupling to control the information recorded.

Another object of the invention is to provide a semi-permanent memory of simplified design which may be produced at low cost.

The semi-permanent memory provided in accordance with this invention includes input means consisting of a group of magnetic cores, one for each stored word, together with drive means for selectively exciting any individual core, and output means consisting of a plurality of sense windings. There are as many sense windings as there are bit positions in the words stored, and each sense winding is capable of serially coupling each word core of the group. Each individual sense winding represents a single bit position common to all words. The point of coupling between a core and a sense winding constitutes a single bit storage cell. The value stored in each cell is controlled by whether or not the coupling between the sense winding and the core is effective. Each sense winding is threaded serially through all of the cores of the array so that it is potentially coupled to each, but a bypass winding branch is provided at each core position to provide an alternate winding path which is not magnetically coupled to the coret. By opening the bypass branch the inductive coupling of the winding may be rendered effective to represent a stored binary one. By leaving the bypass intact and opening the coupled portion, the coupling of the winding may be rendered ineffective to represent a stored zero.

An important feature of the invention resides in the construction of the memory which provides for simple and rapid alteration of the stored information. The word cores are provided in the form of openable structures so that sense windings may be bodily inserted or removed without the necessity of threading them through the cores. The windings are provided upon sheets or cards which are arranged to be spindled upon the opened cores. The sense winding cards are provided in such a form that any desired information pattern may be created by the simple act of punching or otherwise opening the bypass or the coupled winding portion at each word position.

The invention also contemplates an arrangement wherein information is stored at the point of coupling between a core and a sense winding by controlling the sense of coupling rather than the effectiveness. In this embodiment, there are provided winding patterns which may be selectively punched or otherwise altered so that the windings pass through the cores in predetermined directions, one direction representing a stored one and the other direction representing a stored zero. This embodiment of the invention is capable of operation as an associative memory wherein stored information may be retrieved on the basis of its information content rather than its location. The information representing windings may serve as input or drive windings for the cores. Currents may be applied to each of the windings in directions representative of bit values in a sought-after word. If the coupling pattern of the windings with any given core matches the pattern of input currents, that core will receive a unique excitation which may be detected as an indication that the sought-after word is stored in the array. Inasmuch as this embodiment is capable of identifying an input code group in terms of one core of a group, it is also adapted for code conversion.

Accordingly, it is also an object of this invention to provide a novel memory system adapted for retrieval of stored information on the basis of its information content.

It is also an object of the invention to provide a novel system for performing code or radix conversion.

The foregoing and other objects, features and advantages of the invention will be apparent from the following more particular description of preferred embodiments of the invention, as illustrated in the accompanying drawings.

Figure 1:
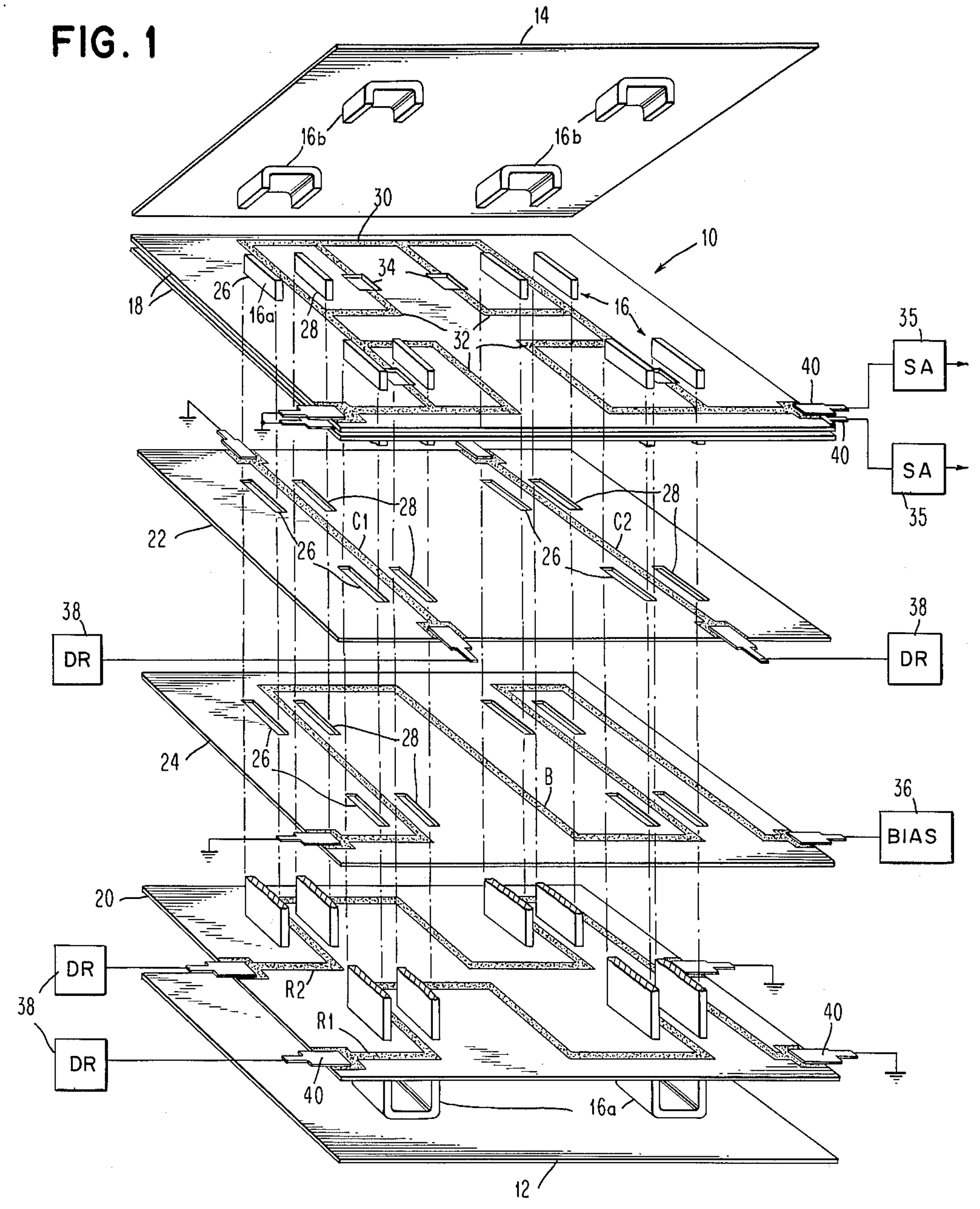
FIG. 1 is an exploded perspective illustration of a semi-permanent memory provided in accordance with this invention.

Referring now in detail to the drawings, there is shown in FIG. 1 an exploded perspective view of a semi-permanent memory array 10 provided in accordance with this invention. The array 10 comprises a pair of opposed base members 12 and 14 which support therebetween a plurality of closed flux path magnetic cores 16. The cores 16 are arranged in a coordinate array of rows and columns. Each core 16 is composed of two complementary sections **16*a* and 16*b* attached, respectively, to the members 12 and 14. The sections 16*a* of the cores are preferably elongated U shaped members, as shown, to receive thereon a plurality of sense winding supporting sheets or cards 18, and drive winding supporting sheets or cards 20, 22 and 24. The sections 16*b* act as keeper plates to close the flux paths through the sections 16*a***.

Each of the cores 16 represents a different word storage location in the array 10. Each of the sense winding cards 18 represents a different bit position common to all words. Each card 18 has formed therein a plurality of paired apertures 26 and 28, the pairs being arranged in rows and columns to register with and receive the legs of the core sections **16*a* when the cards are placed upon the cores. Each pair of apertures identifies one core position on the card. A sense conductor 30 is printed, plated or otherwise deposited upon each card 18. The pattern of the winding is such that it passes serially between the apertures 26 and 28 of every pair in the card. The sense conductor 30 includes, at every core position, a bypass or jumper section 32** which extends around the pair of apertures at that position in parallel with the conductor portion which passes between the apertures.

Figure 2:
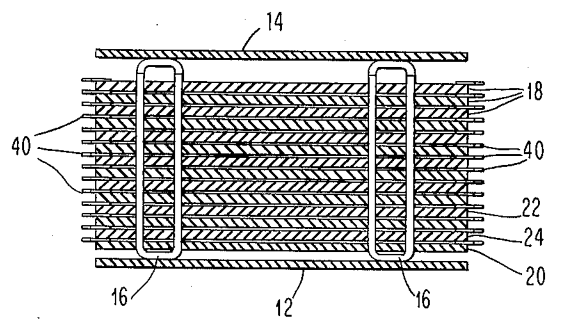
FIG. 2 is a vertical sectional view of the memory unit of FIG. 1 showing the various members in their actual positions.

It will be seen that when the card 18 is placed over the several core sections **16*a* and the upper support plate 14 is fitted on as indicated in FIG. 2, to complete the magnetic circuits for the cores 16, the winding 30 is potentially magnetically coupled in series to each of the cores 16 via the winding portions which pass between the paired core receiving apertures 26 and 28, and also potentially isolated from each core via the jumpers 32**.

Information is stored in the array in terms of the presence or absence of magnetic coupling between the windings 30 on the several cards 18 and the cores 16. Each core represents a different word storage location, and each card 18 represents a different bit storage plane. The individual core positions on the cards 18 represent bit storage cells. A binary one is stored in a given bit storage cell by open-circuiting the jumper 32 which bypasses that core position, and a binary zero is stored by leaving the bypass intact but open-circuiting the portion of the winding 30 which couples the core. The open-circuiting may be accomplished by punching out a section of the wiring as indicated at 34 in FIG. 1, or in any other desired manner.

In FIG. 1, the top sense card 18 is punched so that binary ones are stored in the upper left and upper right core positions, while zeros are stored in the other two positions. It will be noted that the selection of whether the sense winding 30 passes through or around a particular core has no effect on any other core position, and that regardless of the information pattern recorded, a complete conductive path extends from one terminal of the sense winding 30 to the other.

The sense cards 18 may be of any suitable non-magnetic and non-conductive material, and the sense windings 30 may be applied thereto in any desired manner. For example, cards of polyethylene terephthalate, sold under the trademark "Mylar," may be employed with wiring patterns obtained thereon by known electroplating techniques.

Information is read from the memory 10 by driving a selected core to produce a change of flux therein, and sensing the outputs induced in the winding 30 on the several sense cards 18. Those windings 30 which are magnetically coupled to the excited core will have output voltages induced therein indicative of stored binary ones. Those windings not coupled to the excited core will not produce any output, and binary zeros will be indicated. Sense amplifiers, indicated at 35 in FIG. 1, are provided to amplify the sense signals and pass them to a utilization device (not shown).

Considering the magnetic characteristics of the cores 16, and the apparatus for activating individual cores, any of several arrangements may be employed. In the memory shown in FIGS. 1 and 2, the cores 16 are fabricated from a saturable magnetic material, for example a ferrite, and exhibit hysteresis characteristics of the type shown in FIG. 3. Coincident-current selection techniques are employed to drive the cores 16. A separate row drive winding R1, R2 is provided for each row of cores 16 and a separate column drive winding C1, C2 is provided for each column. A bias winding B is serially coupled to all cores. In FIG. 1, the row column and bias windings are shown as printed upon cards 20, 22 and 24 respectively, which are fitted over the several cores in the same manner as cards 18. It will be understood, however, that conventional windings threaded through or wound around the cores may be employed if desired.

Figure 3:
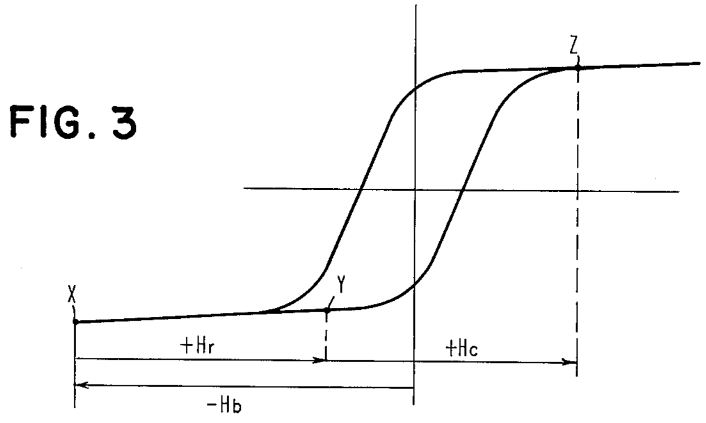
FIG. 3 is a hysteresis diagram of one of the word cores of the memory of FIG. 1, illustrating the way in which the cores are selectively operated.

The bias winding B is provided with a constant current, for example from source 36 in such a direction and of such magnitude that it creates in all cores 16 a bias field $-Hb$ (see FIG. 3) sufficient to hold all cores well in negative saturation at, for example, point X. Each of the row and column windings R1, R2, C1, C2 is coupled to a separate driver 38 capable of supplying current in a direction and of a magnitude sufficient to create in all associated cores 16 a field $+Hr$ or $+Hc$ which opposes the field $-Hb$ but is of lesser strength. One field $+Hr$ or $+Hc$ applied alone is sufficient only to drive the core along the flat negative saturation portion of its loop to, for example, point Y. The fields $+Hr$ and $+Hc$ are each greater than half the magnitude of $-Hb$ so that when two such fields are coincidentally applied to a selected core they are additively sufficient to overcome the bias field and drive the core to the positive saturation portion of its hysteresis loop, for example, to point Z. The voltages induced in the several sense windings 30 during this magnetic excursion of the selected core indicate the information stored. When the row and column inputs are terminated, the bias field $-Hb$ will return the core to its reset point X. It will be understood that the cores 16 may be only partially switched, if desired, rather than fully switched as indicated in FIG. 3.

It will be apparent to those skilled in the art that the selection system just described permits any selected core 16 in the array to be individually excited, by coincident activation of the row and column windings which intersect at that core, without disturbance of non-selected cores. Known addressing systems may be utilized to operate the drivers 38.

It will be understood that the function of the bias means described above is to create a substantial threshold field which must be exceeded before a core may be switched, thereby permitting the use of coincident-current selection techniques with non-square loop cores 16. In the event that cores having square hysteresis loops with well-defined square "knees" are employed, the bias means may be eliminated. In such a case, bipolar drivers will be required to return the activated cores to their reset state, or a separate reset winding common to all cores must be provided.

This invention also contemplates the use of linear magnetic material for the cores 16, together with individual input windings (not shown) for each core, and some external selection means (for example, a conventional matrix switch) for selectively energizing individual input windings.

Among the advantages of the memory 10 of FIGS. 1 and 2 is the ease with which changes of stored information may be accomplished. All that is required to effect a change of information, is to disconnect the sensing circuitry 35 from the cards 18, remove the upper base member 14 and the attached core sections 16*b* and lift out the cards 18. A new set of cards containing different information may be inserted, the member 14 replaced, sense circuit connections re-established, and operation may be resumed. To facilitate simple connection and disconnection of the sensing circuitry, each card 18 may be provided with connectors 40 to which the sensing circuitry may be rapidly connected through a suitable plug member.

Figure 4:
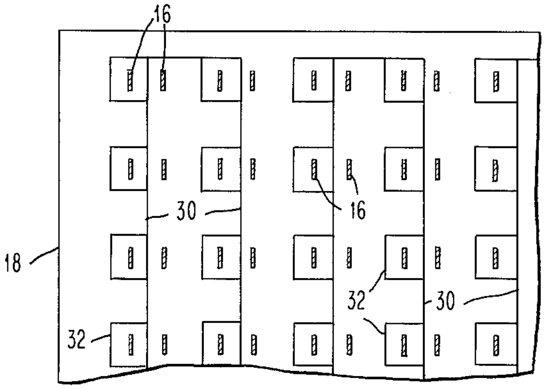
FIG. 4 is a fragmentary horizontal sectional view illustrating a memory unit having a large number of storage positions.

Although FIGS. 1 and 2 illustrate a memory 10 having but four words of storage and only a few sense cards 18, it will be apparent that any number of rows and columns of cores may be provided and that a large number of sense cards will be employed. In FIG. 4 there is shown a fragmentary sectional view taken through a unit having a large number of words of storage. FIG. 4 illustrates a typical sense winding pattern which the cards 18 of such a unit might bear.

Figure 5:
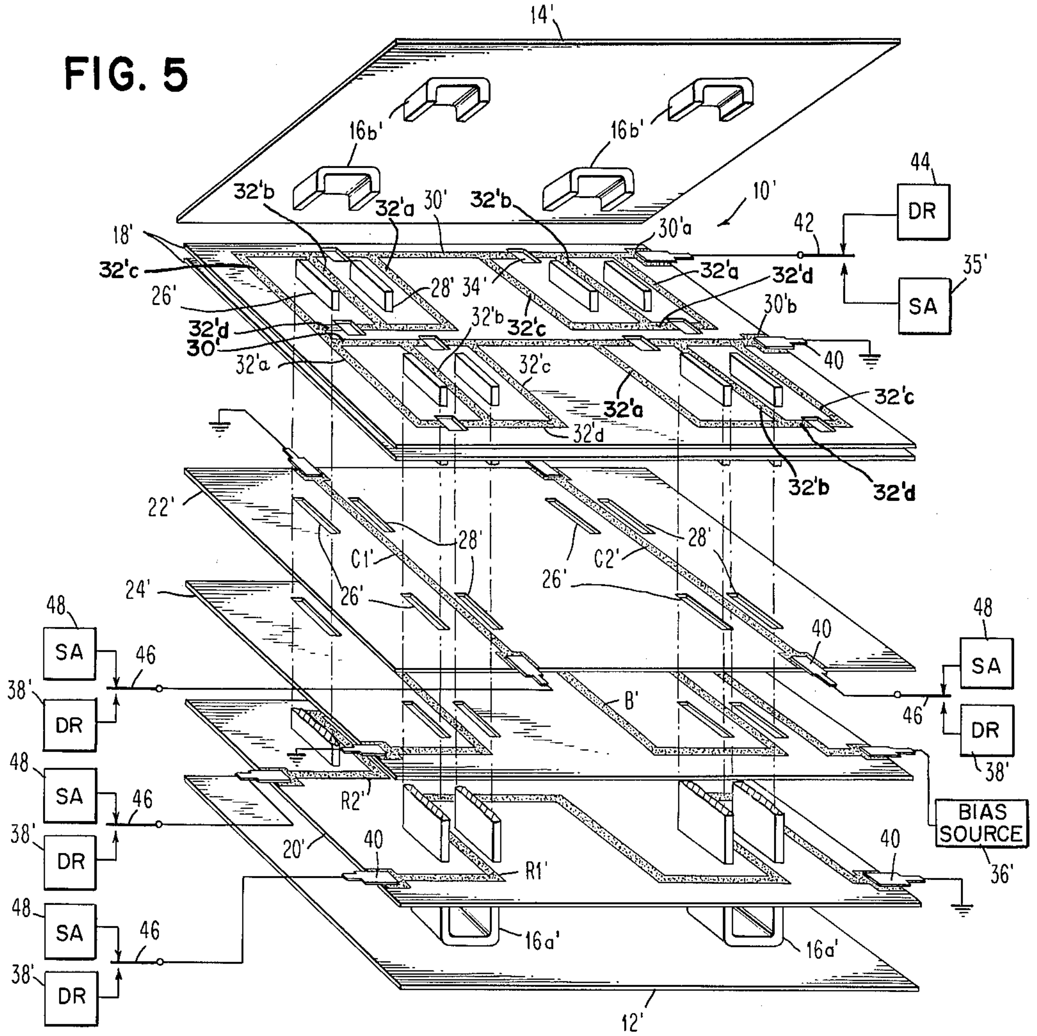
FIG. 5 is an exploded perspective view illustrating a modified form of the invention adapted for use as an associative memory.

In certain applications, it is desirable to have information stored in such a manner that it can be retrieved on the basis of at least part of its information content, rather than on the basis of some known location. A memory arranged for operation in this mode is often referred to as an associative memory. In such a memory retrieval is accomplished by comparing a search word (or word portion) with the information content of all words in storage. Favorable comparison with a given stored word locates the sought after information. In FIG. 5 there is shown a memory 10' provided in accordance with this invention which is capable of operation in an associative mode as well as the normal location-addressed mode.

The memory 10' employs the same general construction as is shown in FIG. 1, that is to say, it comprises base plates 12' and 14' respectively supporting complementing core sections 16*a'* and 16*b'*, together with a plurality of information representing cards 18' and row, column and bias winding cards 20' 22' and 24'. In this embodiment of the invention, the winding pattern provided on the cards 18' is such that each winding 30' may be arranged to pass between each pair of core receiving apertures 26' and 28' in either of two opposite directions by selective opening of branch paths. As shown in FIG. 5, each winding 30' extends from a first terminal 30'*a* past each core position in series to a second terminal 30'*b*. At each core position three branch paths 32'*a* 32'*b* and 32'*c* are provided, each connected to the winding 30' at one end, and by a jumper 32'*d* at the other end. These various branches and jumpers form two potential current paths through each core position, one path in one direction and another in the opposite direction. Information is recorded in each core position in terms of the direction of the current path between the core receiving apertures 26' and 28'. For example, a binary one may be recorded by arranging the current path so that current flowing from terminal 30'*a* toward 30'*b* will pass down (toward the front of the card 18' as viewed in FIG. 5) between the apertures 26' and 28' of each core position. A zero is recorded by arranging the path so that current flowing in the same direction will flow up between the apertures.

The selection of the direction of the current path is accomplished by punching or otherwise opening certain of the branch paths. To record a binary one, the jumper 32'*d* is opened between branches 32'*a* and 32'*b* and the winding 30' is opened between branches 32'*b* and 32'*c*. The path, then, traced from terminal 30'*a* passes down through 32'*b* and back up through 32'*c*. The lower left and upper right core positions of the top card 18' of FIG. 5 are punched in this manner. A zero is recorded by punching the winding 30' between branches 32'*a* and 32'*b* and the jumper 32'*d* between branches 32'*b* and 32'*c* so that the winding, traced from terminal 30'*a* passes down 32'*a* and up through 32'*b*.

It will be apparent that this embodiment of the invention may be operated as a location-addressed semi-permanent memory in the same manner as the embodiment of FIG. 1, provided that the sensing apparatus coupled to the windings 30' is capable of distinguishing information values upon the basis of polarity differences in the outputs induced in the several windings 30'. Since each winding 30' is coupled to all cores, excitation of any given core will provide an output voltage in each winding 30'. The voltages induced in windings coupled to represent ones will be of opposite polarity to voltages induced in windings coupled to represent zeros.

Operation of the memory 10' in the associative mode requires a reversal of functions of the drive and sense windings. For associative information retrievals, the windings 30' are employed as drive windings and the row and column windings R1', R2', C1', C2' are used as sense windings. In FIG. 5 switch 42 is shown for transferring the winding 30' from the sense amplifier 35' to a driver 44. Switches 46 transfer the row and column windings from the drivers 38' to sense amplifiers 48. The switches 42 and 46 are symbolic of circuitry for jointly connecting drivers and sensing circuitry to common windings, and are shown only to facilitate an understanding of the invention. Any known common drive-sense circuitry may be employed.

To understand the operation of the memory 10' in the associative mode, consider the following example:

Let it be assumed that the memory 10' has four information representing cards 18' (only two are shown for the sake of clarity) which define the tag or associative area of the stored words. Other cards 18' may also be present to represent further data associated with the tags. Let it be assumed that the values of the tags of the several words (the various words being identified by their row and column coordinates) are:

Word R1'–C1'=1000
Word R1'–C2'=0000
Word R2'–C1'=0001
Word R2'–C2'=1100

The upper card 18' of FIG. 5 represents the most significant digit of each of these tags.

Figure 6:
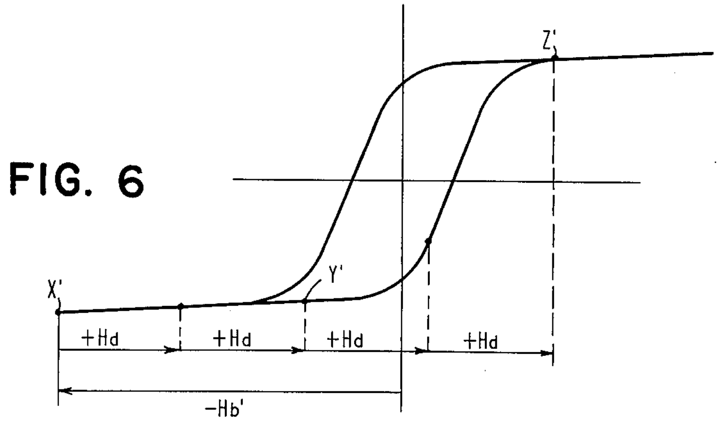
FIG. 6 is a hysteresis diagram of one of the word cores of FIG. 5 illustrating the way in which a stored word is identified on the basis of its information content.

Let it further be assumed that the bias winding B' is energized to apply the field $-Hb'$ to all cores 16' as shown in FIG. 6 so that all cores reside at point X'.

To perform an associative retrieval, the drivers 44 coupled to the tag representing cards 18' are energized in accordance with the tag word being sought, for example, 1000. The drivers 44 are bipolar, and are activated in one polarity, e.g. to send current into terminal 30'*a* to represent a one, and in the opposite polarity e.g. to send current into terminal 30'*b* to represent a zero. The drivers supply current sufficient to produce fields of magnitude H*d*. Interrogation current representative of a particular binary value passing through a winding which is coupled to a core to represent the same value will produce a field $+Hd$ in the core. Current representative of a particular value passing through a winding coupled to represent the opposite value will produce a field $-Hd$. It can be seen from FIG. 6 that the magnitude of these fields is such that a total of $+4Hd$ is necessary to overcome the bias $-Hb'$ and switch a core 16'.

The tag interrogation currents applied to the windings 30' of the tag representing cards 18' will all pass in the same direction through the core 16' of word R1'–C1' since the coupling of the windings 30' with this core match the search tag. Core 16' of word R1'–C1' will, therefore, receive $+4Hd$ and will be switched from point X' to point Z' (or only partially switched, if desired) producing a sensible output on each of the windings R1' and C1'. The presence of these outputs serve to identify the address of the word whose tag matches the interrogation tag.

No core in the matrix other than the cores at address R1′–C1′ will receive sufficient field to cause a flux reversal. The cores at addresses R2′–C1′ and R2′–C2′ will each receive three units of $+Hd$ and one unit of $-Hd$, giving a total of $+2Hd$. As seen in FIG. 6, this is only sufficient to drive the core to point Y′. The core at address R2′–C1′ will receive a net zero excitation and will remain at point X′.

Upon identification of the address of the word containing the sought-after tag, the memory 10′ may return to the normal mode of operation, and the identified address read out in the normal manner to retrieve the information associated with the sought-after tag.

It will be understood that any number of bits may be interrogated during an associative retrieval operation. In any tag interrogation, regardless of the number of bits involved, the core associated with the sought-after tag will receive at least two more units of $+Hd$ than any other core. If the bias field is adjusted so that $(n-2)Hd$, where $n$ is the total number of tag bits, will drive the core only to point Y′, any number of bits may be interrogated.

The memory 10′ just described, when operated in the associative mode, is effective to identify a code group (the search tag) with a unique one of a group of cores 16′. It will be apparent to those skilled in the art that this same apparatus may be employed for code conversion. For example, if each core of the matrix is assigned a decimal value which is the decimal equivalent of the stored binary tag associated with that core, binary-to-decimal code conversion may be performed. By suitable arrangement of the cores in rows of ten, the row and column windings may be made to represent the units and tens digits of the decimal numbers assigned to the cores. Binary-to-decimal conversion may be accomplished by operating the array in the associative mode, while decimal-to-binary conversion may be performed by operating the array in the location addressed mode. Any desired type of code conversion may be provided by inserting different groups of cards 18′ to alter the information patterns stored.

It should be apparent from the foregoing that the present invention provides a highly versatile memory array of the semi-permanent type which is both simple and reliable and which is adapted for rapid alternation of stored information content.

While the invention has been particularly shown and described with references to preferred embodiments thereof, it will be understood by those skilled in the art that various changes in form and details may be made therein without departing from the spirit and scope of the invention.

What is claimed is:

1. A semi-permanent memory apparatus comprising a plurality of magnetic transformer elements each comprising a core of magnetic material defining a closed flux path, each said core having a separable portion which may be removed to permit bodily insertion of a winding into flux coupling relation with said flux path, means for individually exciting any selected transformed element, and a plurality of sense windings each comprising a series connection of a plurality of pairs of parallel branches arranged so that the winding may be removably engaged with the several transformer elements in such a manner that one of each pair of parallel branches is in flux coupling relation with one of said cores and the other parallel branch is not in flux coupling relation with any core, said branches in each of said pairs of parallel branches being selectively interruptible to record an information pattern in each said sense winding.

2. In an information storage apparatus, at least one input means, at least one output means, and a plurality of selectively interruptible alternative conducting elements in the output means for providing a potential inductive coupling between the input means and said output means in either of two opposite senses for inducing a voltage of one polarity or another in the output means in response to activation of the input means, according to the selective interruptions of said alternative conducting elements.

3. An information storage apparatus comprising a plurality of drive lines adapted to carry electric current pulses, a plurality of individual information storage elements along each of said drive lines, each of said elements being constituted as a pair of interruptible current carrying element loops connected to said drive lines in such a manner as to cause a drive line current pulse to flow through a first of said element loops when a second of said element loops has been interrupted and to cause a drive line current pulse to flow through said second element loop when said first element loop has been interrupted, each of said pairs of element loops including a portion of a conductive path common to both of said loops through which the drive line current flows in one direction when said first element loop is interrupted and in the opposite direction when said second element loop is interrupted, and sensing means in electromagnetically-coupled relationship to the common conductive path portion of at least one pair of element loops for identifying the direction in which a current pulse flows therethrough.

4. An information storage apparatus comprising a plurality of drive lines adapted to carry electric current pulses, a plurality of individual information storage elements along each of said drive lines, each of said elements being constituted as a pair of interruptible current-carrying element loops connected to said drive lines in such a manner as to cause a drive line current pulse to flow through a first of said element loops when a second of said element loops has been interrupted and to cause a drive line current pulse to flow through said second element loop when said first element loop has been interrupted, and sensing means inductively coupled to each of said information storage elements in such relation thereto that a current pulse in the respective drive line causes a voltage pulse of a given polarity or a voltage pulse of the opposite polarity to be induced in said sensing means depending upon which of the current carrying element loops in that storage element has been interrupted.

References Cited by the Examiner

UNITED STATES PATENTS

| | | | |
|---|---|---|---|
| 2,814,031 | 11/1957 | Davis | 340—174 |
| 2,909,592 | 10/1959 | Morris | 340—173 X |
| 2,911,627 | 11/1959 | Kilburn | 340—174 |
| 2,981,935 | 4/1961 | Nasoni | 340—174 |
| 3,027,548 | 3/1962 | Vaughan | 340—174 |
| 3,058,097 | 10/1962 | Poland | 340—174 |
| 3,060,411 | 10/1962 | Smith | 340—174 |
| 3,061,821 | 10/1962 | Gribble et al. | 340—174 |
| 3,069,665 | 12/1962 | Bobeck | 340—174 |
| 3,084,336 | 4/1963 | Clemons | 340—174 |
| 3,130,388 | 4/1964 | Renard | 340—173 |

FOREIGN PATENTS

| | | |
|---|---|---|
| 1,213,133 | 3/1960 | France. |

OTHER REFERENCES

Publication I: IBM Technical Disclosure Bulletin, vol. 3, No. 1, page 51, June 1960, #171.

Publication II: IBM Technical Disclosure Bulletin, vol. 3, No. 10, pages 18 and 19, March 1961, #202.

Publication III: IBM Technical Disclosure Bulletin, vol. 3, No. 10, pages 20–21, March 1961, #203.

Publication IV: Proceedings of the IRE, January 1961, pp. 104–128, #195–c.

Additional references on following page

References Cited by the Applicant

UNITED STATES PATENTS

| | | |
|---|---|---|
| 2,613,252 | 10/1952 | Heibel. |
| 2,909,592 | 10/1959 | Morris et al. |
| 3,038,105 | 6/1962 | Brownfield. |
| 3,093,819 | 6/1963 | Lynch. |
| 3,130,388 | 4/1964 | Renard. |

OTHER REFERENCES

Paper entitled: "A High-Speed Permanent Storage Device" by J. M. Wier, published in the IRE Transactions on Electronic Computers, vol. EC–4, pages 16–20, March 1955.

Paper by L. I. Gutenmakher et al.: entitled "Non-Contact Magnetic Devices for Control Systems," pages 113–145 of the Russian publication, Automatic Control and Computer Engineering, originally published in 1958; see English translation published in 1961 by Pergamon Press, volume 1, pages 135 et seq.

IRVING L. SRAGOW, *Primary Examiner.*

R. R. HUBBARD, R. G. LITTON, T. W. FEARS, *Assistant Examiners.*